NOVELL E. WELLS
INVENTOR
BY
BUCKHORN, BLORE, KLARQUIST & SPARKMAN
ATTORNEYS

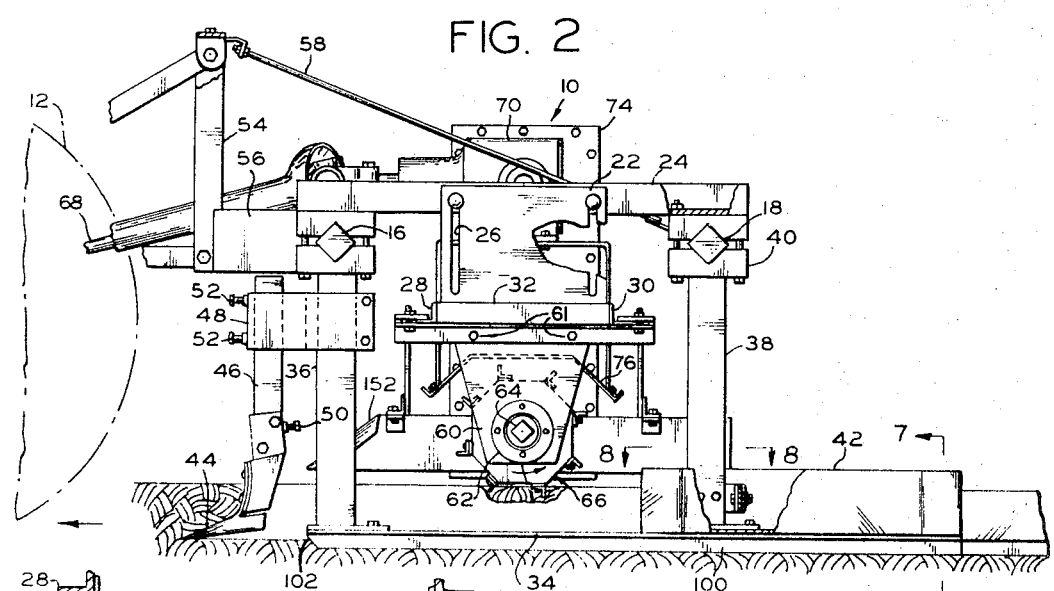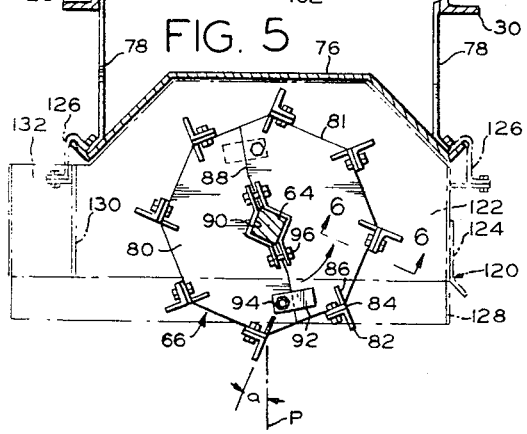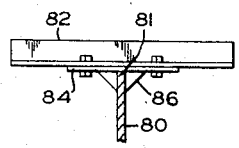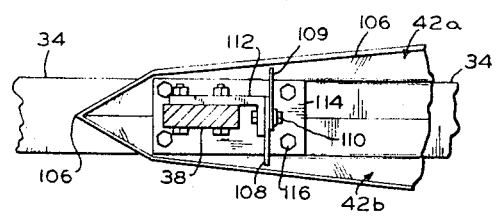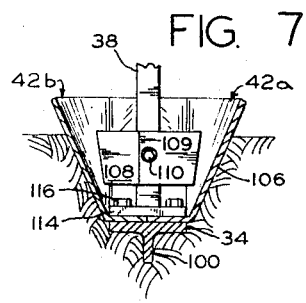

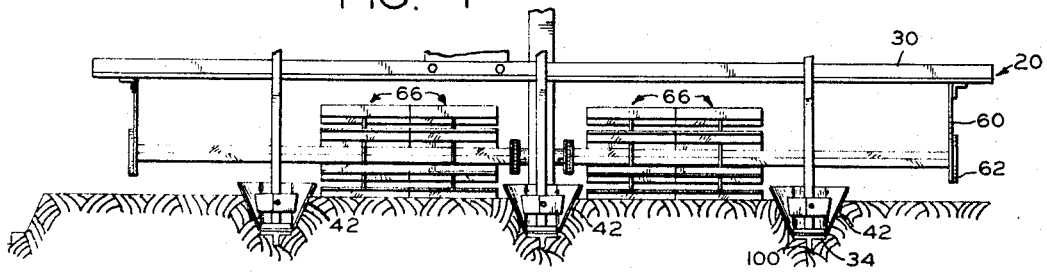
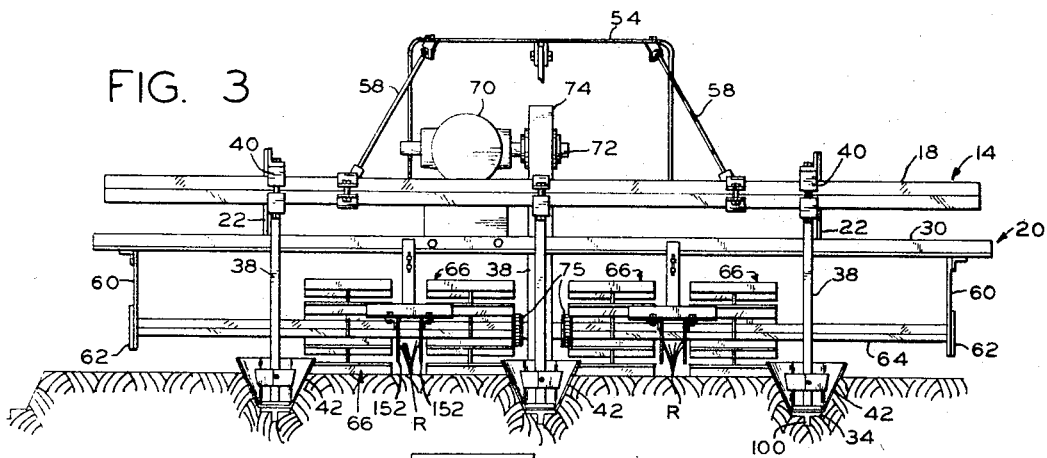
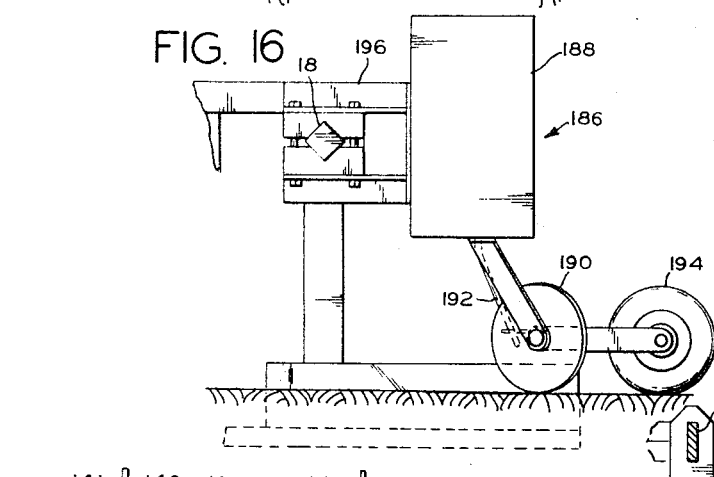
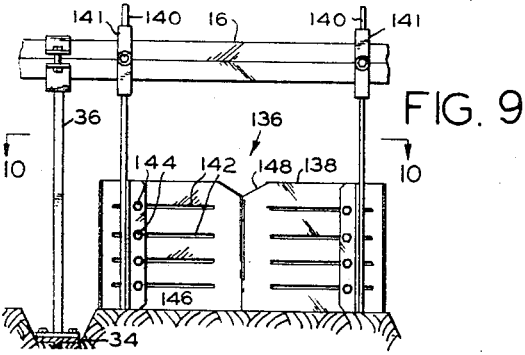
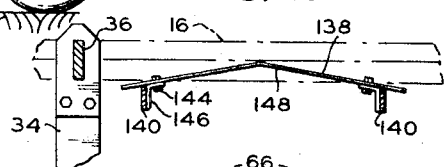

April 8, 1969 N. E. WELLS 3,437,061
MULTIPLE USE AGRICULTURAL IMPLEMENT
Filed March 16, 1966 Sheet 4 of 4

NOVELL E. WELLS
INVENTOR
BY
BUCKHORN, BLORE, KLARQUIST & SPARKMAN
ATTORNEYS

United States Patent Office 3,437,061
Patented Apr. 8, 1969

3,437,061
MULTIPLE USE AGRICULTURAL
IMPLEMENT
Novell E. Wells, 927 Ranch Road, Boise, Idaho 83702
Filed Mar. 16, 1966, Ser. No. 534,845
Int. Cl. A01c 23/02, 5/06; A01b 33/02
U.S. Cl. 111—1                                27 Claims The present invention relates to agricultural implements and more particularly to a multiple use agricultural implement capable of shaping a raised plant bed and cultivating such bed at the same time. Although the implement's primary uses are in bed shaping and cultivating, it has other uses as well.

In raising row crops in irrigated regions it is common practice to raise such crops in elevated plant beds which are bounded on opposite sides by parallel irrigation furrows from which water seeps into the beds. In the past such beds have had to be shaped, prepared for seeding, seeded and cultivated using several different and specialized machines as, for example, a bed-shaping implement for forming the furrows and intermediate raised beds, another implement for leveling the bed surface and tilling the bed in preparation for planting, and still another implement for planting the seeds. This was both costly and time consuming for the farmer. The implement of the present invention is capable of doing all of the above operations and others as well, and is capable of shaping the plant bed, preparing the bed for seed, and seeding, all in a single operation if desired, thereby resulting in great savings in time and labor.

Accordingly, a primary object of the present invention is to provide an improved implement capable of shaping a series of plant beds and cultivating the beds, either before or after planting, in a single operation.

Another primary object is to provide an implement adaptable for use with a multiplicity of earth-working tools whereby the implement has a variety of uses, including seeding, in addition to its primary use as a combination bed shaper and cultivator.

Still another important object is to provide an implement as aforesaid having a novel self-tracking feature which enables an unskilled operator to do an exceptional job of cultivation. Through this feature, the implement makes its own tracks in its initial pass over an area and then follows in exactly the same tracks in each successive pass over the same area.

A more specific object is to provide a new and improved skid member and bed-shaping element which increases the lateral stability and tracking ability of an implement as aforesaid.

Another specific object is to provide a new and improved rotary cultivating element for a cultivating implement which is separable for easy removal of such implement from its drive shaft and which has an improved blade construction for more effective tilling.

A further object is to provide a combination cultivating and bed-shaping implement having an improved and simplified frame construction.

Still other objects are to provide a multiple-use implement as aforesaid having an improved bed-leveling attachment, an improved replaceable skid construction, an improved plant shield, and an improved dirt-deflecting attachment.

GENERAL DESCRIPTION

In furtherance of the above objects, an illustrated embodiment of the invention includes a sled-like implement adapted to be towed behind a tractor and having a laterally extending, rectangular main frame supporting a vertically adjustable subframe. The entire frame assembly is supported on a plurality of elongate and laterally spaced-apart skid members, which carry on their rear end portions plow-shaped bed-shaping elements for forming a series of parallel furrows. The subframe supports a driven shaft which carries a plurality of rotary cultivating elements spaced between the skid members and adjustable along the shaft. The shaft is driven by a chain and sprocket drive arrangement from a gear box mounted on the subframe which in turn is powered by a power takeoff shaft from the tractor. The bottom surface of each skid member has a downwardly extending keel which forms a groove for guiding the implement both in its initial pass over a given area and in successive passes over the same area.

The above and other objects and advantages of the present invention will become more apparent from the following detailed description which proceeds with reference to the accompanying drawings wherein:

FIG. 2 is a side elevational view of the implement of FIG. 1 on approximately the same scale as FIG. 1;

FIG. 3 is a rear end elevational view of the implement of FIG. 1 on a slightly reduced scale, showing the implement set up for cultivating after the crop is up;

FIG. 4 is a partial rear end elevational view similar to FIG. 3 showing the lower portion of the implement frame and the rotary cultivating elements set up for seed bed preparation prior to planting;

FIG. 5 is a view, partly in section, taken along the line 5—5 of FIG. 1 showing on an enlarged scale one of the rotary cultivating elements;

FIG. 6 is a sectional view taken along the line 6—6 of FIG. 5 showing an outer portion of the cultivating element;

FIG. 7 is a vertical sectional view taken along the line 7—7 of FIG. 2 on a scale somewhat enlarged from that of FIG. 2 showing the construction of one of the skid members and its attached bed-shaping element;

FIG. 8 is a view, partly in section, taken along the line 8—8 of FIG. 2 showing in plan a front portion of a bed-shaping element and an intermediate portion of a skid member;

FIG. 9 is an elevational view of a portion of the front tool bar of the implement of FIG. 1, looking toward the front of the implement, and showing a bed-leveling attachment attached to the bar;

FIG. 10 is a view taken along the line 10—10 of FIG. 9 further illustrating, in plan, the bed-leveling attachment;

FIG. 16 is a schematic side elevational view illustrating a seed-planting attachment attached to the rear tool bar of the implement of FIG. 1.

DETAILED DESCRIPTION

General assembly

Figure 1:
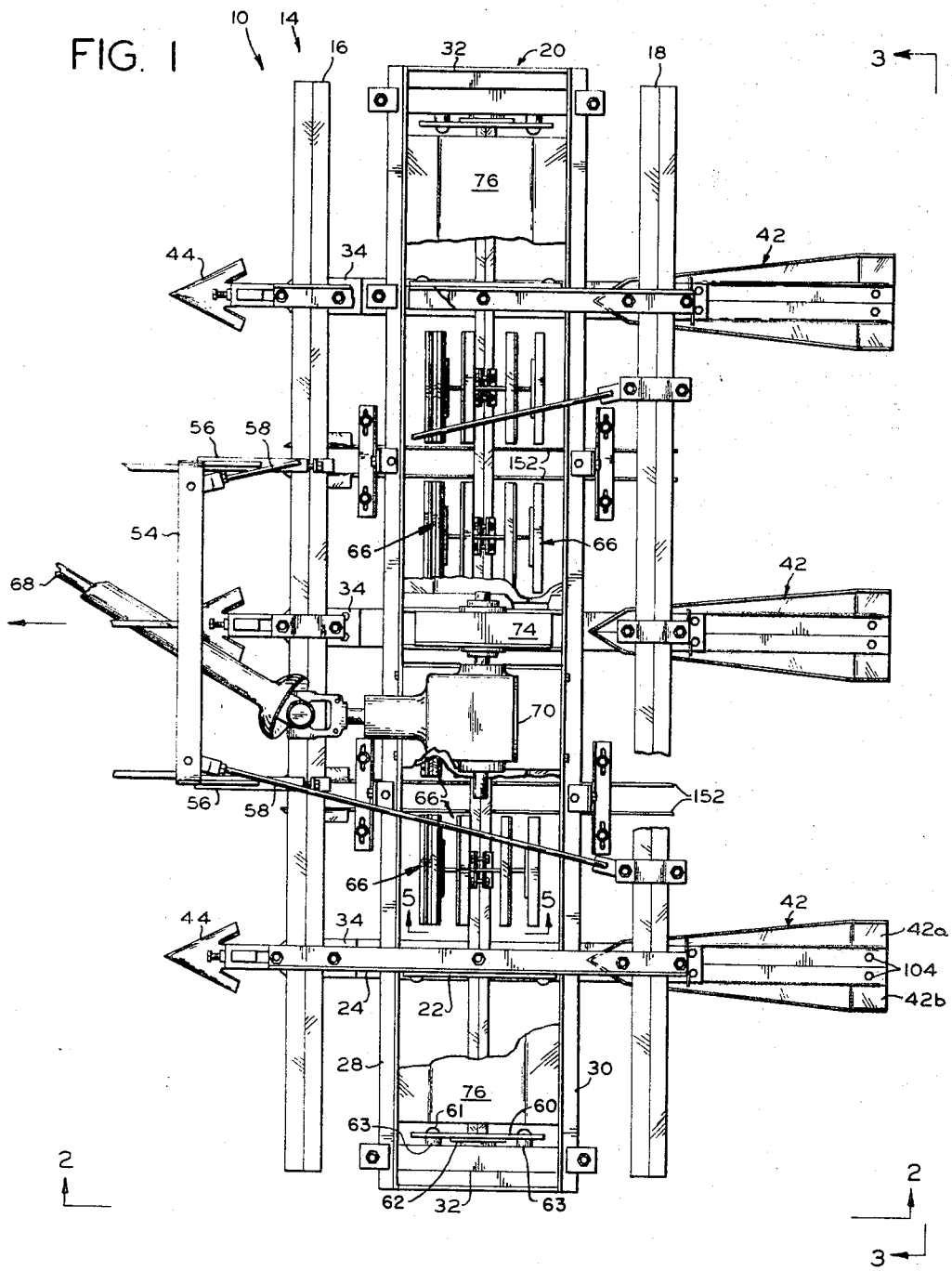
FIG. 1 is a top plan view of an implement in accordance with the present invention.

Referring first to FIGS. 1 and 2 of the drawings, the illustrated implement includes a sled-like frame structure 10 adapted to be towed behind a tractor 12. The frame structure is subdivided into a generally rectangular main frame 14 including front and rear tool bars 16 and 18, respectively, extending parallel to one another and laterally of the direction of travel of the implement, and a rectangular subframe suspended by hanger plates 22 from cross members 24 of the main frame. Each of the hanger plates is provided with a pair of vertical slots 26 through which bolts extend so that the subframe can be adjusted vertically relative to the main frame and the ground. The subframe itself is composed of parallel front and rear angle members 28, 30 joined together by end members 32.

Three elongate skid members 34 are suspended by vertical struts 36, 38 from the front and rear tool bars of the main frame, with each strut being clamped to its respective tool bar by a clamping member 40. The skid members are equally spaced apart along the tool bars and extend in the direction of travel of the implement so as to serve as runners which enable the tractor to tow the implement over the ground surface.

A generally plow-shaped bed-shaping element 42 is mounted on a rear portion of each skid member and serves to form an irrigation furrow having outwardly sloped side walls when the implement s towed over a plowed field. Mounted just forwardly of the nose end of the skid member is an earth-penetrating tool 44 which can take the form of either of bull prong (not shown) or the illustrated cultivator shovel. The penetrating tool is adjustably mounted on an upright support 46 which in turn is rigidly carried in a clamping memebr 48 extending forwardly from front strut 36. The angle of penetration of the tool 44, and thus the depth of the furrow, can be controlled by an adjustment screw 50 on support 46. The level of tool 44 with respect to the skid is adjusted by set screws 52 on clamp 48. The earth-breaking tool 44 is particularly useful for shaping beds in hard-packed soil but would not necessarily be required in working softer earth.

The tractor is connected to the sled by a three-point drawbar 54 which includes rearwardly extending plates 56 mounting the drawbar on front tool bar 16 and a pair of overhead brace rods 58 extending from the overhead portion of the drawbar to rear tool bar 18 to give the sled a certain amount of lateral stability. Instead of the three-point hitch a conventional tongue (not shown) can be mounted on the tool bar for connection to the tractor. Also optionally, and not shown, trailing wheels can be mounted from the rear tool bar if desired to partially support the implement. Such wheels are particularly useful when the sled is to be drawn by a tractor having less power than that required for drawing efficiently the sled mounted on the skids alone.

As shown most clearly in FIGS. 2 and 3, a pair of vertical bearing hanger plates 60 are secured by bolts 61 to end angle members 32 of subframe 20 and carry bearing members 62 which rotatably support the opposite ends of a rotor shaft 64. The shaft is square in cross section for convenience in mounting thereto a plurality of rotary cultivating elements 66, two of which are shown positioned between each pair of skid members. The rotary cultivating elements are adjustable along the shaft, as will be evident from comparison of FIGS. 3 and 4, for cultivating both plant beds before seeding and plant beds containing growing crops. Flexible spacers 63 secured by bolts 61 between hanger plates 60 and angle members 32 permit lateral movement of the hanger plates and thus prevent binding of shaft 64 upon flexing of the same, which generally occurs upon lifting of the unit, or upon the rotors striking ground of unusual hardness during the cultivating operation.

Power for driving the rotor shaft is transmitted through a power takeoff shaft 68 from the tractor to a gear box 70 on the subframe. The gear box delivers power through a horizontal shaft 72 to an upper sprocket on such shaft forming part of a chain-and-sprocket drive assembly (not shown) within a vertical housing 74. A lower sprocket (not shown) of the chain-and-sprocket drive is mounted within housing 74 on a central portion of rotor shaft 64, which central portion is connected by chain couplings 74 (FIG. 3) to the main, rectangular sections of such shaft. The foregoing subframe-mounted drive arrangement enables simultaneous adjustment of the height of all the cultivating wheels by a single simple adjustment of the subframe with respect to the main frame.

As shown in FIGS. 1, 2 and 5, a safety shield 76 is suspended from the subframe by hanger straps 78 and extends the length of the subframe just above the cultivating wheels. The purpose of the shield is to protect the operator from stones, clods of earth and other hard objects that might otherwise be thrown upwardly through the subframe by the cultivating wheels.

*Cultivating wheels*

Each cultivating wheel 66 is of a unique split construction which enables it to be removed from its shaft without the necessity of removing the shaft from the subframe. Referring to FIG. 5, each cultivating wheel includes a plate-like central web or base member 80 having, in outline, the shape of a regular octagon including eight straight peripheral edges 81, each having mounted at its leading end an earth-tilling blade 82 extending laterally of web 80 and parallel to the other blades. More specifically, with reference to FIG. 6, each blade 82 is an angle member having a pair of flanges normal to one another, with one of the flanges being bolted to a mounting flange 84 fixed to peripheral edge 81 of web 80. The mounting flange is stabilized laterally by a pair of triangular brace plates 86 fixed, as by welding, to both the web and the mounting flange. It will be noted from FIG. 5 that as the rotor rotates in a counterclockwise direction, the outwardly projecting portion of each blade will be inclined slightly forwardly at an angle $a$ with respect to a vertical plane $p$ extending through the axis of the web member and rotor shaft 64 when the blade reaches its lowermost, or six o'clock, position. This feature is important in that the blades will not be disposed vertically until they begin to leave the earth so that such blades will tend to push loose soil more rearwardly than upwardly in rotating upwardly out of the earth, thereby minimizing dispersion of loose soil by wind and minimizing any dust problem under dry conditions.

Web member 80 is split into two parts along a crooked parting line 88 which extends from opposite peripheral edges 81 of the web intermediate a pair of adjacent blades 82 to a central opening 90 in the web through which shaft 64 extends. Connector straps 92 are fixed one to one side of one web section and the other to the opposite side of the other web section. Each strap extends over the opposite web section and is fastened thereto by threaded fasteners 94, which enable the sections to be easily separated for removing the rotor from shaft 64. Four clamping members 96, one secured to each side of each web section, are bolted together about shaft 64 to secure the wheel firmly to such shaft. Each wheel can be adjusted along shaft 64 simply by loosening the clamp bolts, sliding the wheel along the shaft to the desired position, and retightening the bolts.

*Skid and bed-shaper assembly*

The skid and bed-shaping assembly itself has several unique features which improve its performance over analogous elements of prior bed-shaping and skid-type implements. Skid member 34 is longer than prior such elements, extending both forwardly and rearwardly of the cultivating wheels and far forwardly of the attached bed shaper, as shown in FIG. 2. Referring to the enlarged view of FIG. 7, the skid member in cross section is generally rectangular and has flat top and bottom surfaces and a considerably greater width than thickness.

A long and narrow keel 100 extends downwardly from the center of the bottom surface of each skid and extends throughout substantially the entire length of the latter. The keel, together with the unusual length of the skid, gives the skid increased tracking ability which resists any tendency of the bed shaper to climb up the sides of the furrow formed thereby. It was this tendency of prior bed-shaping implements which the present skid is designed to eliminate. In this regard the keel forms a narrow groove, or track, at the bottom of the furrow in which the keels of other skids will travel during subsequent passes over the same area with the same or other similar skid-mounted implements. The keel itself has a relatively great depth in comparison to its width and the width of the skid member, a typical keel being one inch deep and one-quarter inch thick.

The skid member extends forwardly of the bed-shaping element 42 and terminates at its front end in a blunt nose 102 just rearwardly of the earth-penetrating tool 44. The plow-shaped bed-shaper itself is made in two longitudinal half sections 42a, 42b each of which is removably fastened at its rear end to the top of the skid member by fasteners 104 (FIG. 1). The two bed-shaping sections come together in a relatively sharp point 106 at their forward ends just forwardly of rear strut 38, and then flare increasingly outwardly and upwardly in the rearward direction from such end. Thus as the implement is dragged over the soil, the outwardly sloping sides 106 of the bed shaper form similarly inclined sidewalls of an irrigation furrow having a flat, grooved bottom formed by the skid member.

Forward portions of the bed-shaper sections are fastened to rear strut 38 by overlapping mounting flanges 108 and 109. The flanges extend inwardly from opposite sidewalls of the bed-shaping sections and are secured to a rear flange portion of an L-shaped mounting bracket 110 by fastener 112, the bracket in turn being secured by bolts to rear strut 38 as clearly shown in FIG. 8.

Another feature of the skids is that they are removable from their front and rear struts so that they can be replaced easily upon wearing out. To facilitate ready removal of the skids from their struts, each strut has an enlarged foot portion 114 at its lower end (FIG. 7) through which threaded fasteners 116 extend to secure the skid member thereto. With respect to rear strut 38, the horizontal bottom flange portion of each section of the bed-shaping element extends between the foot and the top of the skid so that the shaper section is secured to the foot in the same manner as the skid member.

It is important to point out that the skids have utility both with and without the bed shapers. In non-irrigated regions where raised beds are not required, the skids are used without the shapers and earth-penetrating tool attached. In such instances it has been found that the unusually long skids still provide the implement with exceptional lateral stability and tracking ability, with their keels still forming grooves which provide tracks for the implement to follow in during subsequent operations.

MISCELLANEOUS ATTACHMENTS

(a) Incorporator shield

The foregoing describes the basic machine of the invention including its primary earth-working elements. In addition to the foregoing, however, numerous attachments can be used in conjunction with the basic elements to increase the machine's overall efficiency and increase the number of operations for which it can be used. One of such attachments, shown in phantom outline in FIG. 5 is an incorporator hood 120 including generally vertical and rigid sidewall portions 122 and endwall portions 124 which, together with the safety shield 76, encase each rotory cultivating element. The side and endwalls are fastened to subframe angle members 28, 30 by brackets 126 and the same hanger straps 78 that support the safety shield. The lower side and endwall portions 128 of the incorporator shield are preferably made of flexible material, such as rubber, so that they will flex upon engagement with uneven ground. The incorporator shield also includes an interior vertical partition 130 which, together with a front wall of the shield defines an open top 132 through which herebicide can be injected into the soil immediately in front of the cultivating wheel from a herbicide dispenser (not shown) mounted on the subframe.

(b) Bed leveler

Another important attachment, shown in FIG. 9 and 10, is a bed leveler 136 taking the form of a vertical plate 138 preferably mounted by uprights 140 and clamps 141 to front tool bar 16 directly in front of a pair of cultivating wheels 66 during preparation of the seed bed. As viewed in plan, leveling plate 138 angles forwardly toward its center so that as the plate is dragged over a raised bed, the loose, uneven clods of earth will be pushed to the side of the bed and into the furrows on either side thereof which are simultaneously being formed by skids 34 and their attached bed shapers.

Each side of the leveling plate includes a series of vertically aligned horizontal slots 142 through which fasteners 144 extend to fasten the leveling plate to angle member 146 which in turn is fastened to one of the uprights 140. The angle of forward inclination of the leveling plate can be controlled by the positioning of the fasteners 144 along slots 142. It will be noted from FIG. 9 that the central portion of the top edge of the leveling plate has a V-shaped notch 148. The plate is reversible so that the top edge as shown in FIG. 9 can be positioned adjacent the surface of the bed, in which case the V-shaped notch is used to form a salt ridge down the center of the bed.

(c) Plant shield

Figure 11:
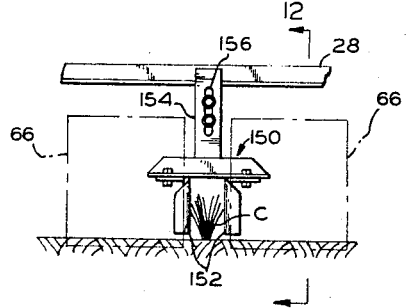
FIGS. 11 and 12 are somewhat schematic front and side elevational views, respectively, of a crop-shielding attachment for the implement of FIG. 1.
Figure 12:
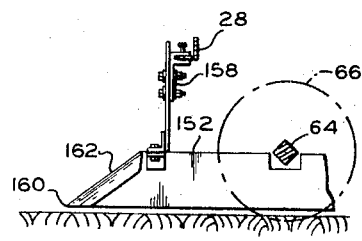

FIGS. 11 and 12 illustrate a plant shield attachment used in conjunction with each pair of cultivating wheels in cultivating a plant bed after the crop is up. Each plant shield includes a pair of upright laterally spaced-apart shield members 152 which extend longitudinally between a pair of cultivating wheels 66 just outside the crop row so that the growing crop C will pass between the shield members 152 as wheels 66 move down a plant row.

The front portions of each shield member are mounted on a common T-shaped mounting bracket 154, the stem of which has a vertical slot 156 for providing an adjustable mounting of the stem with respect to a clamping member 158 (FIG. 12) which in turn is secured to the front angle member 28 of the subframe. The mounting of the rear end portions of the shield members is identical to that of the front end portions shown .

The front end portion of each shield member tapers downwardly to a point 160 at its lower forward extremity. The inclined front edge of each member is folded outwardly and rearwardly to form a blunt deflector flange 162 for deflecting foliage of the growing crop inwardly between the shield members without injuring the same.

(d) Disc harrow

Figure 13:
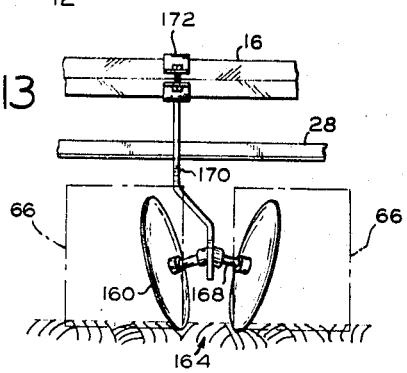
FIG. 13 is a somewhat schematic elevational view of a disc harrow attachment for the implement of FIG. 1.

Another attachment to be used in conjunction with cultivating the plant beds after the crop is growing is a disc harrow 164 as shown in FIG. 13. The disc harrow includes a pair of circular, downwardly and inwardly inclined earth-cutting discs 166 mounted at opposite ends of generally laterally extending axles 168 carried by an upright and angularly offset support rod 170. The support rod is fastened at its upper end by clamp 172 to front tool bar 16 in a position such that the earth-cutting lower edges of the discs cut the earth at positions just inwardly of the innermost edges of the blades of the cultivating wheel 66 and just outwardly of the crop row.

(e) Dirt deflectors

Figure 14:
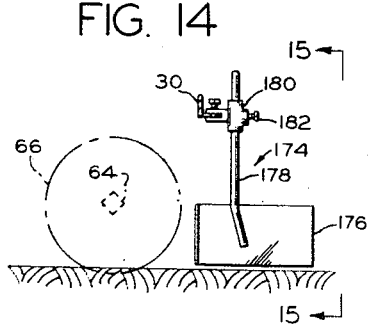
FIGS. 14 and 15 are somewhat schematic side and front eleveational views, respectively, of a dirt-deflecting attachment for the rear tool bar of the implement of FIG. 1.
Figure 15:
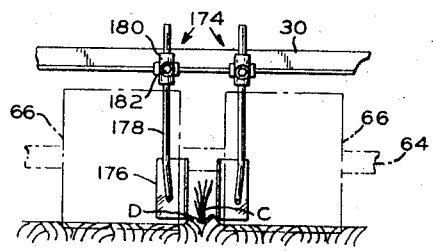

Still another attachment used in conjunction with cultivating growing crops is a dirt deflector 174 as shown in FIGS. 14 and 15. Each dirt deflector includes an upright dirt-deflecting plate 176 which is fixed to an upright support rod 178, the upper end of which is held in a clamp member 180 secured to rear angle member 30 of the subframe. A set screw 182 on clamp 180 provides for adjustment of the blade both vertically and angularly so that as shown in FIG. 15, dirt carried rearwardly by the rotating cultivating wheel 66 can be deflected in the desired direction. The dirt deflectors are preferably used in pairs, one adjacent the inner edge of each one of a pair of cultivating wheels 66 in the positions shown in FIG. 15 so that an accumulation of dirt D can be directed against against the base of growing crop C.

(f) Seed planter

FIG. 16 illustrates that the implement can be used to seed the plant bed as well as to shape and cultivate the same. A seed planter 186 comprising a seed hopper 188, ditching wheel 190, seed discharge tube 192 and press wheel 194 is mounted on the rear tool bar 18 by a rearwardly extending strut 196 attached to the hopper. With the seed planter, bed shaping, seed bed preparation, and seeding can be performed at the same time in a single pass of the implement over a plowed field.

OPERATION

FIGS. 1, 2 and 3 illustrate the implement set up for bed maintenance and cultivating rows of growing crops. The pairs of cultivating wheels are separated so as to travel down the plant beds just outside the crop row R. Plant shields 152 are in place to protect the crop. If desired, dirt deflectors 174 and disc harrows 164 could be used instead of the plant shields, depending on the condition of the soil and crop. It might also be desirable to use the incorporator shield and herbicide during the cultivating operation if weed control is needed.

FIG. 4 illustrates the implement set up for bed shaping and seed bed preparation. The pairs of cultivating wheels 66 are positioned side by side in the center of each bed so that they will till the soil in which the seeds will be planted. The plant shields, disc harrow and dirt deflectors are normally removed from the implement during this operation. Bed levelers 136 and seeder 186 might also be used during this phase to combine bed shaping, bed leveling, tilling and planting in a single operation.

Although the illustrated implement is capable of forming three furrows at one time and two beds therebetween, other implements in accordance with the invention might be equipped with a greater or lesser number of skids and bed shapers for forming more or fewer furrows. Available tractor power and requirements of farmers will, of course, vary, so that several different sizes of machines normally would be made available. It has been found, however, that in implements having more than three skids, additional bearing hangers 60 for rotor shaft 64 should be provided between the end hangers shown because of the resultant increased length of the shaft in the larger implements.

Having illustrated and described a preferred embodiment of the invention, it should be apparent to those skilled in the art that the invention permits of modification in arrangement and detail. I claim as my invention all such modifications as come within the true spirit and scope of the appended claims.

I claim:
1. An earth-tilling implement adapted to be towed behind a tractor, said implement comprising in combination:
 a frame extending laterally of the direction of travel of said implement,
 a plurality of elongate skid members extending longitudinally beneath said frame and depending from said frame at laterally spaced-apart positions thereon and at least partially supporting said frame for travel on the ground surface,
 a plurality of rotary cultivator elements rotatably carried by said frame with at least one said element being positioned between each adjacent pair of skid members,
 means carried by said frame for rotating said cultivator elements,
 and a bed-shaping element mounted on each said skid member,
 said bed-shaping elements including a pair of opposite sidewalls joined together along the front end of each and flaring outwardly away from one another in a direction rearwardly from said front end and upwardly from said skid member so that said skid member and said bed-shaping element coact together to form a generally flat-bottomed irrigation ditch with outwardly sloping sidewalls.

2. An implement according to claim 1 wherein said skid members extend forwardly and rearwardly of said rotary cultivator elements at a level below said cultivator elements,
 said bed-shaping elements being mounted on rear portions of said skid members and rearwardly of said cultivator elements.

3. An implement according to claim 2 wherein each said skid member has a blunt nose,
 and an earth-breaking tool mounted immediately in front of said nose, said tool having a blade portion projecting forwardly from adjacent said nose at approximately the same level as said nose.

4. An implement acording to claim 2 wherein said rotary cultivator elements are adjustable laterally with respect to said frame.

5. An implement according to claim 1 wherein said bed-shaping elements are detachably mounted on said skid members.

6. An implement according to claim 1 wherein each said skid member comprises an elongate member having a width greater than its thickness and having a substantially flat bottom surface,
 and a relatively narrow keel member extending downwardly from the bottom surface of said skid member.

7. An implement according to claim 6 wherein said keel extends along the longitudinal centerline of said bottom surface throughout substantially the entire length of said skid member.

8. An implement according to claim 1 including a pair of vertical struts depending from said frame,
 and means at the lower ends of said struts for connection to front and rear portions of said skid members and removably mounting said skid members on said frame.

9. An implement according to claim 1 wherein said frame includes a generally rectangular main frame including front and rear tool bars extending parallel to one another,
 a subframe carried by said main frame between said front and rear tool bars, including means mounting said subframe for vertical adjustment beneath and relative to said main frame,
 means mounting said skid members to the front and rear tool bars of said main frame,
 and shaft means mounting said rotary cultivator elements on said subframe.

10. An implement according to claim 9 including an incorporator hood attachment removably mounted on said subframe and enclosing the sides and top of a cultivating element when so mounted,
 said incorporator hood including a top opening in a forward portion thereof in front of said cultivator element for injecting herbicide or fertilizer into the soil immediately in front of said cultivator element, whereby a thorough mixing of soil and herbicide or fertilizer in a concentrated area results.

11. An implement according to claim 9 including a protective shield means carried by said subframe and extending generally horizontally above said cultivator elements for protecting the operator of said implement from hard objects thrown upwardly by said cultivator elements.

12. An implement according to claim 9 including drive means for rotating said shaft, said drive means including a power input shaft, a transmission on said subframe receiving power from said input shaft, and rotary drive means interconnecting said transmission means and said shaft.

13. An implement according to claim 1 including shaft means rotatably carried by said frame, means adjustably securing said cultivator elements on said shaft so that said elements can be selectively fixed in different positions along said shaft, each of said cultivator elements comprising at least two sections separable along a parting line extending through said shaft so that said cultivator members can be removed from said shaft without removing said shaft from said frame.

14. In a cultivating implement according to claim 1 wherein said rotating means includes a drive shaft extending laterally of the direction of travel of said implement, and drive means for rotating said shaft in a rotary direction such that the lower part of said shaft travels in a direction generally opposite the direction of travel of said implement, said rotary cultivator elements comprising:
a mounting plate for mounting on said shaft so that the axis of said plate coincides with the axis of said shaft,
and a plurality of parallel earth-digging blades extending laterally of said plate and projecting outwardly from the outer peripheral edge of said plate,
means mounting said blades at circumferentially spaced-apart locations on the peripheral edge of said plate,
the projecting portion of each said blade being inclined in a direction slightly forwardly of a vertical plane through the axis of said plate when the same blade is rotated to its lowermost position with respect to said shaft, whereby said blade when leaving the earth traveling in a generally rearwardly direction will tend to impel particles of earth more rearwardly than upwardly.

15. A rotary cultivator element according to claim 14 wherein said plate member is in the shape of a polygon having a plurality of straight outer peripheral edges,
each said blade comprising an angle member including a pair of flanges at right angles to one another,
one flange of each said blade being mounted on a leading end portion of each peripheral edge of said plate member and the other flange of each blade extending outwardly from said edge.

16. A rotary cultivator according to claim 15 wherein said plate has eight peripheral edges so that it has a generally octagonal shape.

17. A rotary cultivator member according to claim 14 wherein said plate is split into two substantially equal parts along a parting line extending through a central portion of said plate and terminating at opposite peripheral edges of said plate between adjacent pairs of said blades,
and connector means including threaded fastening members connecting together the two sections of said plate, whereby said plate can easily be divided into its separate sections for removal from and mounting on said shaft.

18. An implement according to claim 1 wherein said rotary cultivator elements comprise:
a plate-like body member having a central opening therethrough and adapted for mounting on a driven shaft,
a plurality of parallel earth-digging blade members extending across said body member and mounted at circumferentially spaced-apart positions on the periphery of said body member,
said body member being divided into a pair of separable sections along parting lines extending from opposite peripheral edges of said member to said central opening,
said parting lines terminating at positions on said peripheral edge portions between adjacent ones of said blades,
and connector means for connecting said plate sections together along said parting lines, including threaded fastening means whereby said plate sections can be separated for removal of said rotary cultivator element from said driven shaft.

19. A rotary cultivator element according to claim 18 having a single body member and flange means on the peripheral edge portions of said body member for mounting said blades.

20. In a sled-type agricultural implement adapted to be towed behind a tractor,
a skid member comprising:
an elongate body member having a substantially flat bottom surface,
and a keel member projecting downwardly from said bottom surface and extending longitudinally of said body member,
said keel member being relatively narrow as compared to the width of said bottom surface so that as said implement is skidded over an earth surface said keel member will compress the soil therebeneath and form a grooved track for guiding the same and other similar ski-mounted implements in succeeding passes along the same path,
and a plow-shaped bed-shaping element mounted on a rear portion of said skid member so that a substantial portion of said skid member projects forwardly of said element.

21. Apparatus according to claim 20 including a pair of upright struts extending upwardly from said skid member, one adjacent a forward portion of said skid member and one adjacent a rearward portion thereof,
and means removably mounting said skid members on the lower ends of said struts for facilitating replacement of said skid members when the same become worn out.

22. Apparatus according to claim 21 wherein said skid member has a blunt nose at the forward end thereof,
an earth-breaking tool mounted forwardly of said nose at approximately the same level as said skid member,
and means mounting said earth-breaking tool on the forward one of said struts.

23. Apparatus according to claim 20 wherein said skid member has a blunt nose at the forward end thereof,
and an earth-breaking tool mounted just ahead of said nose and projecting forwardly of said nose at substantially the level of said skid member.

24. An implement according to claim 1 including seeding means for attachment to said frame and mounted behind said cultivating elements and in approximate longitudinal alignment therewith.

25. An implement according to claim 1 including bed-leveling means removably mounted on said frame in front of and in line with said cultivator elements, said means including an upright plate of generally V-shaped configuration as viewed from a horizontal plane with the base of the V being the forwardmost portion of said plate, said plate being adjustable for adjusting the angularity of the V.

26. An implement according to claim 1 including plant shield means including a pair of vertically disposed plant shield members removably mounted on said frame between and adjacent pair of said rotor elements on opposite sides of a crop row, each of said plant shield members having foliage-deflecting means on the forward portion thereof.

27. An implement according to claim 1 including dirt-deflecting means having an upright blade portion and an adjustable support member mounting said blade portion immediately behind a cultivator element for deflecting toward the crop row soil thrown rearwardly by said cultivator element.

References Cited

UNITED STATES PATENTS 611,192 9/1898 Barron _____ 172—80
1,347,257 7/1920 Davis _____ 172—190

(Other references on following page)

UNITED STATES PATENTS

| | | | |
|---|---|---|---|
| 1,544,442 | 6/1925 | Gadda | 172—393 |
| 1,983,350 | 12/1934 | Dunbar | 172—188 XR |
| 2,409,123 | 10/1946 | Harral | 172—80 XR |
| 2,569,464 | 10/1951 | Edwards et al. | 172—188 XR |
| 2,723,611 | 11/1955 | Holthouse et al. | 172—76 |
| 2,885,934 | 5/1959 | Gardner | 111—6 XR |

ROBERT E. BAGWILL, *Primary Examiner.*

U.S. Cl. X.R.

111—6; 172—70, 190, 123, 540, 80, 81, 393